No. 654,429. Patented July 24, 1900.
W. A. M. BARTZ.
WINDLASS WINDING ATTACHMENT.
(Application filed Apr. 28, 1900.)
(No Model.)
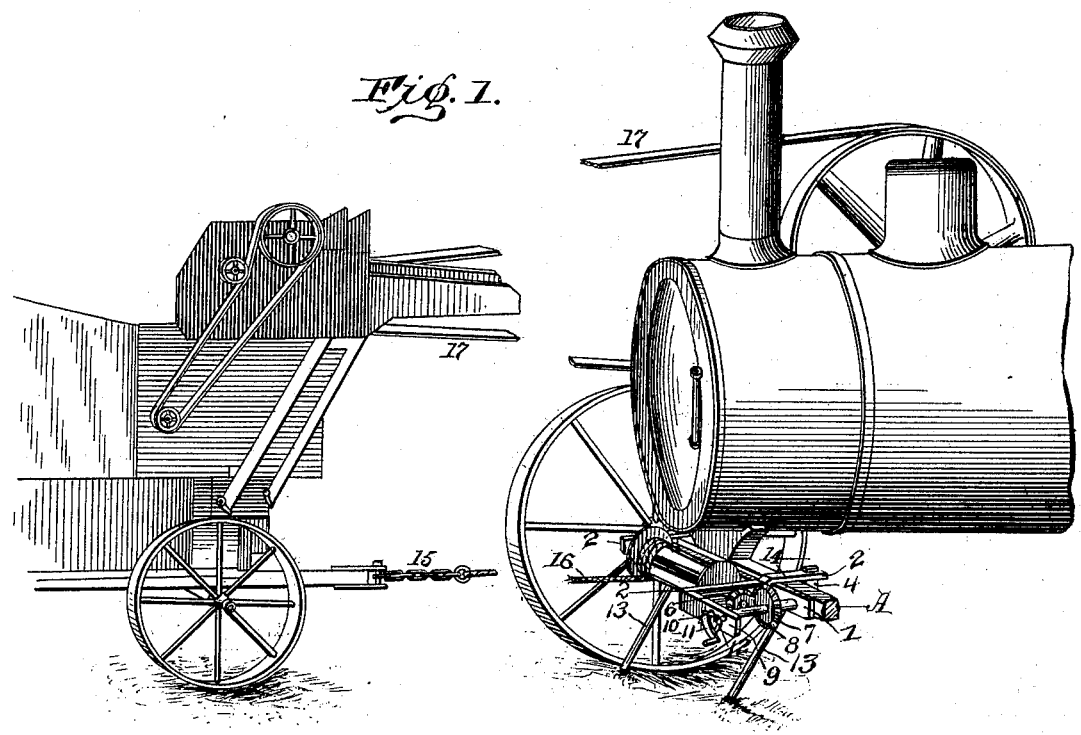
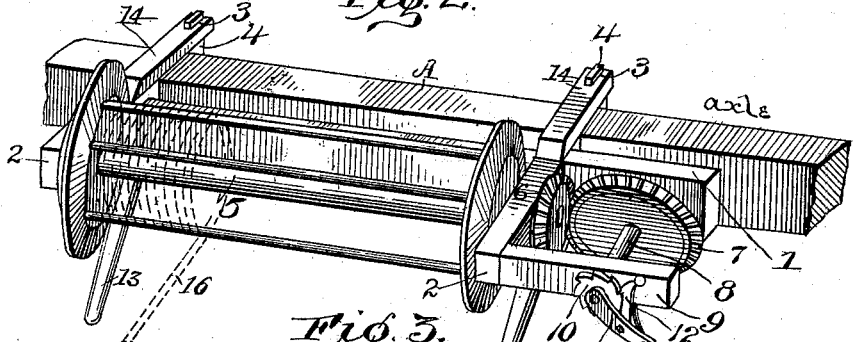
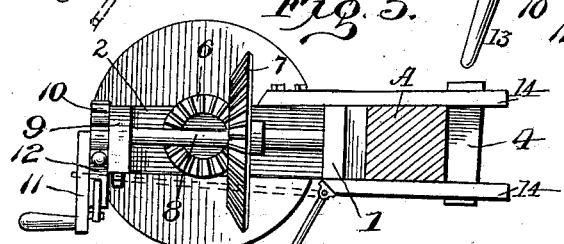
Witnesses:— Inventor
William A. M. Bartz
By Johnson & Johnson
his Atty's.

UNITED STATES PATENT OFFICE.

WILLIAM A. M. BARTZ, OF GRAFTON, IOWA.

WINDLASS-WINDING ATTACHMENT.

SPECIFICATION forming part of Letters Patent No. 654,429, dated July 24, 1900.

Application filed April 28, 1900. Serial No. 14,676. (No model.)

*To all whom it may concern:*

Be it known that I, WILLIAM A. M. BARTZ, a citizen of the United States, residing at Grafton, in the county of North and State of Iowa, have invented certain new and useful Improvements in Windlass-Winding Attachments, of which the following is a specification.

My improvement is a windlass attachment such as used for operating threshing-machines in the field; and the construction of the attachment is such that the winding-reel can be easily set and keyed on the front axle, so as to carry the reel in front, so that the cable can be connected with the threshing-machine when it is desired to pull the thresher about the stacks as they are threshed. For this purpose the cable is about fifty feet long, and the frame of the winding-reel is constructed with a supporting-bar, arms in which the reel is mounted and which are fixed at right angles to the bar and extending back of it are adapted to be keyed upon the axle, bevel-gear mounted in the arms for winding the reel, and props on the arms for anchoring the engine when the winder is being operated to move the thresher to prevent the pulling of the engine toward the thresher.

The accompanying drawings show in Figure 1 the winding attachment as applied to the front axle of a traction-engine and the manner of connecting it to the thresher. Fig. 2 shows enlarged in perspective the winder attachment as keyed upon the axle, and Fig. 3 shows an end view of the winding attachment as applied to the axle.

The frame consists of a bar 1 of a length to be keyed to the front side of the axle A between the wheels of the engine, and to this bar are fixed at right angles two arms 2 2, the ends of which are forked extensions 14 back of the bar 1, adapted to fit over and under the axle A and to receive in their slotted ends 3 3 wedge-keys 4 4, which being driven down in the slots of the arms at the rear side of the axle clamp the bar firmly thereon. The arms 2 2 project a sufficient distance in front of the supporting-bar to receive the shaft 5 of the winding-reel, which is parallel to the bar, and extending through one of the arms has a bevel-gear 6, which is engaged by a bevel-pinion 7 on a shaft 8, mounted in the supporting-bar 1, and in a branch 9 of the arm 2, parallel with the supporting-bar. On the outer end of this gear-shaft 8 is fixed a ratchet-wheel 10, while a crank 11, loose on said shaft, carries a weighted pawl 12, the teeth of the pawl and the ratchet being adapted to maintain engagement while rotating the crank and to permit the pawl to hang down while the reel is being unwound. It will be understood that the pawl is weighted at its outer end, as shown in Fig. 2, and that when the reel is to be unwound the loose crank is turned so as to hang down, and thereby allow the pawl by its weighted end to fall out of and away from the ratchet-wheel, leaving it free of the crank, which is loose on the ratchet-wheel shaft. The spring shown for maintaining the engagement of the pawl is not essential.

The use of the cable-winder is deemed of great importance for moving the threshing-machine as the work is being done and to a place of safety in case the stack should by accident be set on fire. It saves much time and labor and the loss of grain occasioned by the present way in which the threshing-machine is handled to place it with the stacks as they are threshed.

In winding the cable to move the threshing-machine toward the traction-engine the latter would be liable to be moved toward the thresher, and to prevent this props 13 are suitably connected to the outer ends of the reel-supporting arms, whereby the winding attachment is utilized as the means of anchoring the engine to the ground. These props are preferably hinged or connected to the supporting-arms, so that when not in use they can be turned up upon the arms, as shown by dotted lines in Fig. 3. In Fig. 1 is shown a chain 15, whereby to adjustably connect the winding-cable 16 to the threshing-machine to suit the belt-driving connection 17.

I claim—

1. The winding attachment consisting of a supporting-bar, arms fixed thereon having forked ends extending back of the bar and provided with slots, keys engaging the slots whereby to clamp the forked ends upon a carrier-bar, a cable-winding reel mounted in said arms in front of their supporting-bar, a bevel-gear fixed at one end of the reel, a crank-shaft at right angles to the reel mounted in the supporting-bar and in one of said reel-arms, a bevel-wheel on said crank-shaft engaging the reel-gear, a ratchet-wheel fixed on said crank-shaft, a crank-handle loose on said shaft and a weighted pawl pivoted on said crank for use as stated.

2. A winding-reel attachment and in combination with the reel, a carrying-frame therefor consisting of the supporting-bar, arms fixed to and crossing said bar one end of each arm forked and slotted, and keys in said forked arms at one side of the supporting-bar whereby to clamp said frame upon a carrier-bar the said arms forming a mounting for the reel at the other side of said supporting-bar, a crank-shaft mounted in the frame at one end of and at right angles to the reel, a bevel-gear carried at one end of the reel, a bevel-gear on the crank-shaft engaging the reel-gear, a ratchet-wheel fixed on the crank-shaft, a crank-handle loose thereon, a weighted pawl pivoted on the crank-handle and props loosely connected to the reel-bearing arms, for use as stated.

In testimony whereof I affix my signature in presence of two witnesses.

WILLIAM A. M. BARTZ.

Witnesses:
GEO. SWALLOW,
HENRY LUBEENS.